United States Patent Office 2,749,330
Patented June 5, 1956

2,749,330

HYDROLYZED ACRYLONITRILE-ISOBUTYLENE COPOLYMERS

Fred W. Banes, Westfield, and John D. Garber, Cranford, N. J., assignors to Esso Research and Engineering Company, a corporation of Delaware No Drawing. Application December 6, 1952,
Serial No. 324,602

2 Claims. (Cl. 260—85.5)

This invention relates to synthetic polymers, and more particularly to a method for preparing fiber-forming copolymers from a monoolefin and an acrylic compound, and making cationic derivatives of acrylic-olefin copolymers.

Fibers from polyacrylonitrile and from copolymers containing a major proportion of combined acrylonitrile and a minor proportion of another comonomer such as isobutylene and various special methods of preparing such fibers from solutions have been known heretofore. It has also been known that synthetic fibers could be prepared from polyamide type polymers or from adipic acidhexamethylene diamine condensation products by simple melt extrusion. However, heretofore the art has been incapable of producing resinous polymers of high nitrile content which could be formed into fibers by melt extrusion, either because polymers of high nitrile content prepared according to previously known processes were too high melting to allow of direct melt extrusion, and/or because they darkened and became otherwise physically inferior when heated to practical extrusion temperatures.

Prior to the present invention, the only practical method of forming fibers from macromolecular polymers containing a major proportion of combined acrylonitrile involved the dissolving of such polymers in special nitrogen-containing solvents such as dimethyl formamide, dimethyl-methoxy-acetamide, N-formyl morpholine, N-formyl hexamethylene imine, tetramethylene cyclic sulfone, 1,2,3-trithiocyanopropane, gamma thiocyanobutyronitrile, and a few other uncommon solvents. This method is essentially described in U. S. Patent No. 2,404,713, but as is apparent from the character of the solvents which are rare, expensive and often poisonous, the process puts these otherwise highly desirable resins at a serious economical disadvantage as compared with resins capable of being drawn into fibers by melt extrusion, which latter method is particularly desirable since it involves no problem of solvent recovery.

It is an object of this invention to provide the art with macromolecular solid polymers of high nitrile content which can be melt extruded and drawn to form exceptionally strong and otherwise highly valuable fibers possessing a high degree of molecular orientation. A more specific object of the invention is to prepare acrylonitrile-isobutylene copolymers which are very tough and hard, but which may be readily extruded at moderately elevated temperatures and drawn into flexible, grease-resistant, fairly shrink-proof filaments of superior tensile strength. Other objects will become apparent from the subsequent description.

A new method has now been discovered whereby macromolecular resinous copolymers of high nitrile content may be prepared in such a novel form that they can be melt extruded at temperatures between about 280° F. and 400° F. and drawn into strong, flexible fibers, thereby being distinguishable from and superior to related polymers such as those described in British Patent 573,086, which can not be formed into highly oriented fibers by extrusion and drawing.

According to this invention, the nitrile copolymers are modified during their polymerization so that a required amount of copolymer is made up of what is believed to be bound sulphur in the form of thioether radicals. For example, in order to obtain polymers which can be readily extruded and drawn into flexible fibers at temperatures below 400° F. and below the decomposition or degradation point of the polymers, it was found necessary to incorporate 0.05 to 1.5 or even 3% of thioether sulphur, which is equivalent to about 0.1 to 10% of thioether radicals, into the polymer structure, the most preferred amount depending on polymerization conditions, chemical structure of the nitrile and its comonomer, and proportion of combined nitrile in the desired polymer.

Furthermore, while it is recognized that unmodified nitrile polymers have been previously dissolved and extruded in solution by well-known wet or dry spinning processes wherein the polymer is coagulated by suitable chemicals or by heat, it has been found now that the mercaptan-modified polymers of this invention are superior to the unmodified polymers of the prior art, even for fiber formation from solutions because the modified polymers are more readily soluble, so that even the old spinning processes can be made more economical.

In practicing the instant invention, an iso-alkene having 4 to 8 carbon atoms per molecule such as iso-amylene, 2,4,4-trimethyl pentene-1, or preferably isobutene is co-polymerized in aqueous emulsion with an acrylic-nitrile such as acrylonitrile, methacrylonitrile, ethacrylonitrile, alpha-chlor-acrylonitrile, or other similar nitriles or mixtures thereof having the formula $CH_2:CY.C:N$ wherein Y may be selected from the group consisting of hydrogen, methyl, ethyl and chlorine. Copolymers of particularly excellent extrusion properties can be prepared from monomer feeds having a weight ratio of 25–85 parts of acrylonitrile to 75–15 parts of isobutene, which monomer feeds give polymers having a combined acrylonitrile content varying from 62 to 85 weight per cent (as determined by nitrogen analysis).

In general, copolymers having an isobutene content higher than 38% extrude with particular ease, but have poorer shrinkage and solvent resistance characteristics than copolymers having an isobutene content less than 38%. However, besides the chemical composition, the processability and other properties of the copolymers depend upon their molecular weight and other variables which will be discussed subsequently.

For instance, the present invention is applicable to the preparation of copolymers of somewhat different properties which can be obtained by replacing the iso-olefin or iso-alkene of the charge by normal alkenes ranging from 2 to 5 carbon atoms per molecule such as ethylene, n-butene and n-pentene; or cyclic olefins such as cyclopentene, cyclohexene or preferably vinyl cyclohexene; or olefins substituted with one to three halogen atoms such as dichloroethylene, trichloroethylene, allyl chloride and methallyl chloride. Furthermore, the nitrile of the charge may be replaced in part or in its entirety by amides of maleic, fumaric, itaconic, crotonic, methacrylic or other unsaturated acid.

The method of preparing the new extrudable copolymers is carried out by emulsifying the organic monomers in an aqueous medium, the weight ratio of monomers to water being from about 2:1 to about 1:4 or even 1:10, ratios between 1:2 and 1:4 being especially preferred where the monomer feed contains more than 85 weight percent acrylonitrile to 15 weight percent of isobutene.

Furthermore, it is necessary to have the hydrogen ion concentration at a pH value between about 10.5 to 6.5 or lower, and preferably at a pH value within the range of 7 to 9. This can be accomplished conveniently by the addition to the water of sodium bicarbonate, or alkali hydroxides, carbonates or bicarbonates generally. Alternatively, pH values lower than 6.5 are also operative down to a pH of about 3 where such high hydrogen ion concentration is due to the presence of weak acids, especially organic acids such as formic, acetic, oxalic, citric or the like. However, if such high acidity of the aqueous polymerization medium is due to the presence of strong mineral acids, notably sulphuric, the resulting polymer is unduly tough and cannot normally be drawn or extruded satisfactorily and with emulsifiers of the type represented by Emulphor ON the polymerization will not proceed at all under these conditions of high acidity. Conversely, copolymers prepared in systems having a pH higher than about 10.5 are also tough and unsatisfactory for extrusion, though this deleterious effect of high alkalinity can often be compensated at least in part by adding especially large amounts of mercaptan modifier to the polymerization charge, whereby the molecular weight of the resulting copolymer is reduced and the processability thereof improved.

The aqueous portion of the reaction charge should also contain about 2 to 8 or more weight percent (based on combined monomers) of an emulsifier, high emulsifier concentrations being especially recommended where the formation of stable latices is desired from a monomeric mixture containing more than about 85 weight percent of acrylonitrile, and less than 15 weight percent of isoalkene. With monomer feeds containing less than 85 weight percent of acrylonitrile, excellent copolymers can be prepared when the aqueous portion of the charge contains 3 to 5 weight percent of a synthetic detergent type emulsifier exemplified by the formula RSO$_3$M wherein R is selected from the group consisting of alkoxy radicals having 8 to 18 carbon atoms, alkyl radicals having 12 to 30 carbon atoms and of alkyl substituted phenyl or naphthyl radicals having 12 to 30 aliphatic carbon atoms in the alkyl substituent, and wherein $m$ is an alkali metal ion such as sodium or potassium or an ammonium radical. In other words, the detergent emulsifier may be an alkyl sulfate such as potassium octyl sulfate $C_8H_{17}O.SO_3K$, sodium lauryl sulfate $C_{12}H_{25}O.SO_3Na$, sodium cetyl sulfate $C_{16}H_{33}O.SO_3Na$ or ammonium octadecyl sulfate $C_{18}H_{37}O.SO_3NH_4$; or it may be an alkyl sulfonate such as potassium dodecyl sulfonate $C_{12}H_{25}SO_3K$, or sodium tricontyl sulfonate $C_{30}H_{61}SO_3Na$; or it may be an alkyl aromatic sulfate such as the sodium salt of dodecyl benzene sulfonic acid.

Of the aforementioned types of emulsifiers the alkyl sodium sulfates having 12 to 16 carbon atoms such as the sodium lauryl sulfate sold commercially as an aqueous paste containing 33 weight percent of the sulfate (Orvus), or sodium cetyl sulfate have been found particularly favorable to the course of the desired reaction.

Still other types of useful emulsifiers are those obtained by the condensation of alcohols or phenols with ethylene oxide, such as the product commercially known as Emulphor ON and obtained by the condensation of oleyl alcohol with ethylene oxide. This last mentioned emulsifier may be used to produce copolymers well adapted for extrusion into good fibers, but the polymerization yields are somewhat lower than with the aforementioned preferred emulsifiers.

On the other hand, copolymers prepared in the presence of ordinary fatty acid soaps such as the ordinary alkali stearates or oleates or rosin acid soaps such as the Dresinates or soaps derived from tallow acids, are difficult to extrude unless exceptionally large amounts of mercaptan modifier are added to the polymerization mixture so as to reduce the molecular weight of the resulting copolymer considerably below the values ordinarily considered satisfactory for the extrusion of copolymers prepared in the presence of the preferred emulsifiers.

It may be observed that high emulsifier concentrations tend to favor the formation of copolymers of lower intrinsic viscosity and therefore of somewhat better processability than copolymers prepared in systems of low emulsifier content. Accordingly, it will be apparent that the emulsifier concentration need not be limited to the range suggested hereinbefore, but may be advantageously increased to 10% or more if ease of extrusion is primarily desired.

In addition to the previously mentioned ingredients, the water phase also contains about 0.3 to 2 or 5 weight percent (based on monomers) of a peroxide type catalyst exemplified by the water-soluble persulfates or perborates of sodium, potassium or of ammonium. The yield is increased slightly by increasing the catalyst concentration, whereby also an improvement of processing characteristics is obtained because of a concomitant decrease in intrinsic viscosity. However, balancing the desire to have an easily processable polymer with the desire to obtain a fiber of optimum physical and chemical properties, concentrations of about 0.5 to 0.75 weight percent of sodium persulfate or potassium persulfate has been found most advantageous.

Finally it is essential to have present in the reaction mixture an aliphatic mercaptan having at least four and preferably eight to eighteen carbon atoms per molecule. A particularly effective modifier was found in a commercial mixture of primary mercaptans derived from the corresponding mixture of alcohols of cocoanut oil origin. This commercial mercaptan mixture was found to have the following composition as determined by distillation at 5 mm. Hg:

| Mercaptan Fraction | Boiling Range (° C.) | Percent by Volume |
| --- | --- | --- |
| Lower than $C_{12}$ | 77–120 | 3.5–4 |
| $C_{12}$ | 122–123 | 58.5–60.5 |
| $C_{14}$ | 146–148 | 25 –22.5 |
| $C_{16}$ | 170–172 | 9 – 8 |
| $C_{18}$ and higher | 190–192 | 2.5– 2 |

From the above analysis it will be seen that the mercaptan mixture consists predominantly of a major proportion of lauryl mercaptan ($C_{12}$) and a minor proportion of tetradecyl mercaptan ($C_{14}$). Accordingly, whenever a mixture of primary $C_{12}$ to $C_{14}$ mercaptans is referred to in the subsequent description and claims, it will be understood that the more complex mixture defined above is meant. However, other primary mercaptans such as butyl, hexyl, heptyl, and so forth, through hexadecyl mercaptan, are also useful, as are the tertiary mercaptans. Among the latter, t-octyl mercaptan has been found to be especially desirable, being more effective than either t-heptyl or t-dodecyl mercaptans. The amount of mercaptans used should be between about 0.2 and 5 weight percent based on the monomers but the preferred amount necessarily depends on several factors, i. e., acrylonitrile content of feed, type and amount of emulsifier, relative acidity of aqueous phase, reaction temperature, and final properties desired.

The presence of such mercaptan modifiers accelerates the reaction rate and stabilizes the resulting latex so that the reaction mixture is preserved in the reactor as a stable and homogeneous dispersion. This permits the eventual addition of such materials as stabilizers and other ingredients to the vented latex in such a fashion that the added ingredients become uniformly dispersed therein prior to coagulation and subsequent polymer finishing operations, whereby the uniformity and general quality of the product is improved significantly.

However, the most remarkable result of the addition of the mercaptan to the polymerization charge is that by such addition the normal course of the polymerization becomes so modified that the resulting product is capable of extrusion in the form of strong fibers whereas analogous products polymerized in the absence of mercaptans cannot be extruded or drawn. This modification of "internal plasticization" of the polymeric products is especially surprising since heretofore the action of mercaptan modifiers has been usually associated with the existence of conjugated double bonds in the monomeric charge whereas in the present instance no ingredient of the charge is characterized by any conjugated double bonds at all. Furthermore, the unexpected character of the action of the mercaptans in the present invention is strikingly illustrated by the fact that butyl mercaptan has been found to be quite effective as a modifier whereas mercaptans having less than 6 carbon atoms have been known heretofore exclusively as polymerization poisons and even have been used deliberately as short-stopping agents.

After the aqueous and polymerizable portions and the mercaptan of the charge have been admixed in the reaction vessel, vapors of the volatile ingredients are allowed to escape for a few minutes in order to flush the system free of oxygen. The reaction vessel is then sealed and placed on a shaking or agitating device either in a constant temperature bath or in an electrical heating jacket. The reaction mixture is thus heated at temperature of 25–70° C. for a period of time ranging from 2 to 150 hours. Usually, polymerizations have been run at about 40° C. to 60° C. for a period of 10 to 18 hours as illustrated in subsequent examples.

Furthermore, it has been found that the homogeneity can be improved still further by adding the more reactive monomer such as the acrylonitrile continuously or portionwise, instead of all at once. Thereby the mechanical strength and also the transparency of the product are further improved somewhat.

At the end of the polymerization the reactor is removed from the agitating device, vented and the latex poured into a receiver. A short stop agent such as hydroquinone, hydroxylamine hydrochloride and/or other customary processing ingredients may then be added to the latex and coagulation effected in a known manner by means of sodium chloride brine and/or alcohol or the like. The resulting coagulated resinous polymer is then in the form of fine crumbs which can be washed with water to remove the emulsifier, water-soluble catalyst, etc. and the purified polymer can then be dried in any suitable known manner, e. g. on trays, in an oven or on a hot mill, prior to further operations.

Examples illustrative of this method of polymerization are given below:

EXAMPLE 1

Solutions containing 400 grams of water, 27 grams of an aqueous dispersion containing 33 weight percent of sodium lauryl sulfate (Orvus paste) and 1.5 grams of potassium persulfate were charged to a glass-lined, one-liter reactor after the pH of the final solution had been raised to 8.5 by addition of 0.6 gram of sodium bicarbonate to each charge. The desired amount of a commercial mixture of $C_{12}$ to $C_{14}$ mercaptans (Lorol), prepared from the corresponding mixture of alcohols consisting mostly of lauryl alcohol, was then added to the reactor, followed by quantities of acrylonitrile and of isobutylene indicated in the subjoined Table I. The reactors were flushed with isobutylene vapors, sealed and placed on a revolving wheel in a constant temperature bath where they were agitated for 17.5 hours at 50° C. The maximum autogeneous pressure during each of the runs was of the order of 100 pounds per square inch. At the end of this time the reactors were cooled to room temperature and their contents of latex poured into 2-liter vessels. No coagulum or gel was present in these latices and upon addition of sodium chloride brine the polymer coagulated from the latices in fine crumb form. These coagulates were thoroughly washed with warm water to remove all emulsifier and persulfate catalyst and then they were dried in a vacuum oven for about eight hours at about 80° C. The dried polymers were thereafter weighed and tested, the results being summarized in Table I below:

Table I

|  | Polymer | | | |
| --- | --- | --- | --- | --- |
|  | A | B | C | D |
| Monomer Feed (gms.): | | | | |
| Acrylonitrile | 50 | 80 | 100 | 160 |
| Isobutylene | 150 | 120 | 100 | 40 |
| $C_{12}$–$C_{14}$ Mercaptan (gms.) | 1.0 | 1.0 | 1.55 | 4.2 |
| Polymer Yield (gms.) | 67 | 105 | 130 | 186 |
| Conversion (Percent) | 38.5 | 52.5 | 65 | 93 |
| Polymer Analysis: | | | | |
| Percent Nitrogen | 16.45 | 17.10 | 18.19 | 20.10 |
| Percent Acrylonitrile (Calculated) | 62.3 | 64.8 | 69.0 | 76.2 |
| Percent Sulfur | | | 0.16 | |
| Percent Thioether radicals (Calculated) | | | 1.14 | |
| Intrinsic Viscosity [1] | 0.96 | 0.95 | 0.78 | 0.50 |
| Extrusion Temperature (°F.) | 320 | 335 | 345 | 385 |
| Monofil Diam. (mm.) | 0.05 | 0.12 | 0.10 | 0.10 |
| Tensile (p. s. i. $\times 10^{-3}$) | 75 | 55 | 50 | 32 |
| Percent Shrinkage in straight-run mineral spirits having a boiling range of 150–200° C.: | | | | |
| @ 75° C | 40 | 40 | 30 | 2 |
| @ 90° C | 95 | 95 | 82 | 9 |

[1] Determined from solutions containing 0.2 grams of copolymer in 100 cc. of nitromethane, intrinsic viscosity being defined by the relation $$\eta i = \frac{\eta r}{\text{concentration}}$$

where relative viscosity $$\eta r = \frac{\text{time of flow of solution through a capillary}}{\text{time of flow of solvent through same capillary}}.$$

These data illustrate the properties of fibers prepared from copolymers of various composition. It will be seen that as the acrylonitrile contents of the polymeric resins are increased the extrusion temperature must be increased to obtain smooth, ductile materials. In all of the above examples the polymers could be easily extruded and drawn to substantially water white monofilaments of small diameter.

When polymers were prepared with identical charges to those given in Table I except that the mercaptan was omitted, the polymers could not be extruded at temperatures below 400° F. or below their degradation temperature. As a specific example a polymer was prepared with the same charge as given in Table I under Polymer C except that no mercaptan was added to the charge. The dry, washed product weighed 125 grams and contained 18.62% nitrogen (70.6% acrylonitrile) and had an intrinsic viscosity of 1.56. The polymer extruded very slowly at 390° F. to give rough, dark colored rods which could not be drawn to fibers.

EXAMPLE II

The novelty of these copolymers is further illustrated by the following data which were obtained in two runs, A and B, which were identical except that run A was conducted according to the teaching of British Patent 573,086, whereas in run B 1.25 weight percent (on monomers) of a mixture of $C_{12}$ to $C_{14}$ mercaptans (DDM Lorol) has been added to the polymerizable mixture according to this invention. The specific data and results follow.

One hundred grams of acrylonitrile and 100 grams of isobutylene were added to a one-liter reactor (A) containing 6.0 grams of sodium cetyl sulphate (95% purity) as an 8.0% aqueous solution, 0.5 grams of sodium bicarbonate, 2.0 grams of ammonium persulfate and 322 grams of water. The same charge was placed in a similar second reactor (B) and in addition 2.5 grams of a mixture of $C_{12}$ to $C_{14}$ primary mercaptans (prepared from a mixture of the corresponding alcohols) was added to the second reactor. The additions of the various components were carried out in the manner prescribed in the above-mentioned patent and the polymerization was carried out for 137 hours at 25° C. with agitation in a constant temperature water bath. At the end of 137 hours the reactors were removed from the bath, discharged, and the latices coagulated, the coagulate washed and dried in a manner identical to that disclosed in the aforementioned patent. The following data were obtained on the finished polymers:

1.5 g. $K_2S_2O_8$
1.6 g. Lor. mercaptan
400 g. water
10.0 g. emulsifier
17.5 hours at 50° C.

| Type of Emulsifier | Run No. | Emulsifier | Yield (g.) | Percent AN in Product [1] | Int. Vis.[2] | Extrusion |
|---|---|---|---|---|---|---|
| Paraffinic Sulfate (Na Salt) | A | Orvus (Sodium lauryl sulfate). | 122 | 70.0 | 0.76 | Good. |
| (Petroleum Hydrocarbon) (Sulfonate) (Na Salt) | B | Acto 700 (M. W.=470) | 130 | 68.0 | 0.82 | Do. |
|  | C | Acto 550 (M. W.=400) | 112 | 66.0 | 0.84 | Do. |
| Ethylene Oxide-Alcohol (or Phenol) Condens. Product. | D | Emulphor ON | 95 | 72.0 | 0.88 | Fair. |
| Alkyl Aromatic Sulfonate (Na Salt). | E | $C_{18}$ Benzene Sulfonate | 122 | 69.5 | 0.76 | Good. |
| Rosin Acid Soaps (Na Salt) | F | Dresinate 731 [3] | 94 | 71.3 | 1.09 | Very poor. |
| Fatty Acid Soaps (Na Salt) | G | Hydrogenated Tallow Acids or Oleic Acid. | 126 | 65.4 | 0.725 | Poor. |

[1] Combined acrylonitrile content calculated from nitrogen analysis.
[2] Run in nitromethane in conc. of 0.20 g./100 ml. solvent.
[3] Dehydroabietic acids.

*Table II*

|  | Polymer | |
|---|---|---|
|  | A | B |
| Yield of Polymers (parts by weight). | 125.0 | 130.00. |
| Percent Conversion (on Monomers). | 62.5 | 65.00. |
| Percent Nitrogen in Polymer. | 18.74 | 18.64. |
| Percent Acrylonitrile in Polymer. | 71.0 | 70.50. |
| Extrusion Properties | Low rate, very rough, could not be drawn at 350–400° F. | High rate, smooth, readily drawn to fibers of small diam. at 350° F. |
| Fiber Properties: |  |  |
| Monofil diameter |  | 0.110 mm. |
| Tensile Strength |  | 41,000 p. s. i. |
| Shrinkage in straight-run mineral spirits having a boiling range of 150°–200° C. at 75° C. |  | 6%. |

These data illustrate that a polymer prepared according to the method described in British Patent 573,086 cannot be extruded to give fibers whereas the material of this invention gives very satisfactory fibers.

EXAMPLE III

A series of polymers were prepared with identical charges except that the type of emulsifying agent was different in each case. The charges for the various runs are given in the following Table III. In addition, data are given pertinent to the yields, composition, and extrusion properties of the final product. It will be observed that alkyl sulfates, alkyl sulfonates and alkyl aromatic sulfates gave easily extrudable polymers whereas fatty acid and rosin acid soaps gave polymers with very poor extrusion characteristics.

A polymer was also prepared with the same emulsifier and general recipe as given in Run No. G except that the mercaptan content of the charge was increased from 1.60 to 2.52 grams per 200 grams of monomers. The final polymer weighed 121 grams, contained 17.31% nitrogen (65.7% acrylonitrile) and had an intrinsic viscosity of 0.68. However, in spite of this low viscosity this product like the one prepared with less mercaptan could not be extruded at 380° F. without obtaining rough, dark-colored rods incapable of being drawn to fibers.

*Table III*

EFFECT OF EMULSIFIER ON SYNTHESIS OF ACRYLONITRILE-ISOBUTYLENE COPOLYMERS

Charge:
100 g. acrylonitrile
100 g. isobutylene

EXAMPLE IV

The effect of reaction time and temperature was studied in comparative runs wherein 80 parts of acrylonitrile and 50 parts of isobutene were copolymerized according to this invention as an aqueous emulsion in the presence of 4.5 parts sodium lauryl sulfate, 0.84 parts of a mixture of $C_{12}$ to $C_{14}$ mercaptans (Lorol), 0.75 parts of potassium persulfate and 200 parts water, the parts being by weight. Table IV shows the data obtained.

*Table IV*

| Reaction Conditions | | Conversion (Wt. Percent) | Polymer Analysis (Wt. Percent) | | Intrinsic Viscosity |
|---|---|---|---|---|---|
| Time (Hrs.) | Temp. (° C.) | | Nitrogen | Acrylonitrile | |
| 137 | 25 | 64 | 18.67 | 70.7 | 0.91 |
| 5 | 50 | 56 | 18.76 | 71.1 | 0.80 |
| 10 | 50 | 60 | 18.67 | 70.7 | 0.78 |
| 18 | 50 | 63 | 18.67 | 70.7 | 0.78 |
| 24 | 50 | 65 | 18.61 | 70.5 | 0.72 |

These results show clearly that the more elevated polymerization temperature is more advantageous because of the substantially shorter reaction times required for attaining the same conversion as that obtained at the lower temperature. Furthermore, the copolymers prepared at 50° C. have a lower intrinsic viscosity, and hence better extrusion characteristics, than copolymers of the same yield and same combined acrylonitrile content but prepared at 25° C. Conversely, to obtain copolymers extrudable with the same degree of ease a larger proportion of mercaptan modifier must be present in the feed when the copolymer is prepared at a lower temperature than when a copolymer of the same combined acrylonitrile content is prepared at a more elevated temperature.

EXAMPLE V

A study was made of the relations between acrylonitrile content of feed (and copolymer), mercaptan content of charges, intrinsic viscosity, and extrudability of the copolymers. The polymerizations were carried out in glass-lined, one-liter reactors according to the technique described in the previous example, except that the following specific conditions were employed:

| Charge: | Grams |
|---|---|
| Isobutylene plus acrylonitrile in feed | 200 |
| Water | 400 |
| Sodium lauryl sulfate | 9.0 |
| Potassium persulfate | 1.5 |
| $C_{12}$ to $C_{14}$ mercaptan mixture | variable |
| pH (adjusted with $HaHCO_3$) | 8.2 |
| Temperature (° C.) | 50 |
| Reaction time (hours) | 17.5 |

When the ratio of acrylonitrile to isobutylene in the feed was varied from run to run while the amount of mercaptan present in the charge was maintained in each case at 1.25 weight per cent on monomers, the following average results were obtained on a large number of samples.

Table V

| Acrylonitrile/Isobutylene (Weight Ratio) | Conversion (Percent) | Acrylonitrile in Copolymer[1] (Weight Percent) | Intrinsic Viscosity[2] | Extrudability |
|---|---|---|---|---|
| 40/60 | 50 | 65–68 | 0.60 | Excellent. |
| 50/50 | 62 | 68–70 | 0.62 | Do. |
| 60/40 | 74 | 71–73 | 0.65 | Good. |
| 70/30 | 84 | 72–76 | 0.64 | Fair. |
| 80/20 | 92 | 76–80 | 0.65 | Poor. |
| 85/15 | 97 | 80–85 | 0.63 | Do. |

[1] Calculated from nitrogen content of copolymer.
[2] Determined from solutions containing 0.2 grams of copolymer in 100 cc. of nitromethane.

It is apparent from the above results that when the amount of mercaptan was kept constant and the acrylonitrile-isobutylene ratio was varied, all other conditions being the same, the molecular weight as determined in terms of intrinsic viscosity of the resulting copolymers was essentially constant. However, it is significant to note that although the intrinsic viscosity of the several copolymers was very nearly constant, the ease of extrusion became noticeably poorer as the nitrile content of the copolymers increased.

However, from a large number of similar polymerizations it was determined that very good extrusion characteristics can be obtained even in the case of copolymers having a high nitrile content if the amount of mercaptan modifier present in the polymerization charge is increased correspondingly. As a result of evaluation of a large number of copolymers prepared according to the recipe given in the first part of this example but in the presence of different mercaptan concentrations, it has been determined that the extrudability, acrylonitrile content, mercaptan concentration of charge and intrinsic viscosity of the copolymers prepared under the given conditions have an interrelation which is shown by the data summarized in Table VA:

Table VA

| Acrylonitrile/Isobutylene (weight ratio in Feed) | Acrylonitrile Combined (percent) | Minimum Parts of $C_{12}$–$C_{14}$ mercaptan mixture required to give extrudable polymers (wt. percent on monomers) | Maximum Intrinsic Viscosity for Good Extrusion and Drawing to Fibers |
|---|---|---|---|
| 40/60 | 65–68 | 0.5 | 0.9–1.00 |
| 50/50 | 68–70 | 0.7 | 0.8–0.9 |
| 60/40 | 71–73 | 0.9 | 0.7–0.8 |
| 70/30 | 72–76 | 1.25 | 0.6–0.7 |
| 80/20 | 76–80 | 2.0 | 0.5–0.55 |
| 85/15 | 80–85 | 2.75 | 0.41–0.47 |

From the above data, the relation of acrylonitrile concentration to the minimum amount of mercaptan necessary in the polymerization mixture to give a satisfactory extrudable polymer is established by the following logarithmic equation 66.4 log $S = C - 60$, or by the equivalent exponential equation $$S = 10^{\frac{C-60}{66.4}}$$

wherein S is the minimum amount of mercaptan expressed in weight percent on total monomers and wherein C is the weight percent of acrylonitrile based on total monomers. It will be understood, of course, that the amounts of mercaptan indicated by Table VA or by the above equations are merely the minimum amounts necessary and that larger amounts of mercaptan up to 5% on monomers may be preferred in order to obtain a polymer of the most favorable extrusion properties.

EXAMPLE VI

A series of polymers were prepared with an identical charge in each instance except that the pH of the aqueous portion of the charge was varied over the range of 3.35 to 11.5. Data regarding the polymerizations and the polymers produced therefrom are summarized in the following table:

Table VI

Charge:
Acrylonitrile _____ 100 Grams
Isobutylene _____ 100
Sodium lauryl sulfate (added in the form of 27 gms. of Orvus paste) _____ 9
Potassium persulfate _____ 1.5
Water _____ 400
Polymerization: 17.5 hours at 50° C.

| Run | A | B | C | D | E |
|---|---|---|---|---|---|
| Method of pH Adjustment | Formic Acid | Sulfuric Acid | Sodium Bicarbonate | Sodium Hydroxide | |
| pH | 3.35 | 3.55 | 8.2 | 10.5 | 11.5 |
| Lorol Mercaptan (gm.) | 1.9 | 1.9 | 1.9 | 1.2 | 1.9 | 1.9. |
| Polymer Yield (gm.) | 120 | 120 | 124 | 119 | 122 | 116. |
| Percent Nitrogen | 18.57 | 18.36 | 18.11 | 18.41 | 18.34 | 18.48. |
| Percent Acrylonitrile | 70.5 | 69.6 | 68.7 | 69.8 | 69.5 | 70.2. |
| Int. Vis. | 0.84 | 0.98 | 0.75 | 1.4 | 0.95 | 1.50. |
| Extrudability and Ductility | Good | Poor | Good | Very Poor | Fair | Very Poor. |

These data indicate that polymers prepared in aqueous solutions whose pH has been lowered with weak organic acids were easily extruded whereas polymers prepared in solutions whose pH had been lowered with mineral acids were difficult to extrude or drawn to fibers. Polymers prepared in solutions of pH of 10.5 or over were likewise difficult to extrude. The data also shows that as the pH of the aqueous medium was increased beyond a pH of 8.2, the polymers were more difficult to extrude. However, as the mercaptan contents of the highly alkaline pH systems were increased the resulting polymers were more extrudable and were quite similar to polymers prepared in the preferred pH range of 7 to 9.

EXAMPLE VII

Several runs were performed to illustrate the ability of acrylonitrile to copolymerize in the presence of mercaptans with olefinic hydrocarbons other than isobutylene. The polymerizations were carried out in one-liter reactors in the general manner described in detail in several of the preceding examples. Table VII shows the data obtained in these runs, the specific recipe used here being as follows:

Charge: Grams
Acrylonitrile _____ 100
Olefinic comonomer _____ 100
Sodium lauryl sulfate _____ 3.3
Water _____ 400
Potassium persulfate _____ 2.0

Commercial $C_{12-14}$ mercaptan _____ 1.6
Sodium bicarbonate _____ 0.6
Reaction temperature: 50° C.

*Table VII*

| Comonomer | Reaction Time (hrs.) | Yield (g.) | Percent AN in Polymer [3] |
|---|---|---|---|
| Isobutylene | 18 | 124 | 69.5 |
| Butene-1 | 18 | 86 | 90 |
| Butene-1 | 60 | 106 | 85 |
| Butene-2 | 60 | 78 | 90.4 |
| Trimethyl ethylene | 18 | 78 | 80 |
| Trimethyl ethylene | 60 | 84 | 76.6 |
| Isobutylene Dimer [1] | 60 | 110 | 79.2 |
| Butadiene Dimer [2] | 60 | 100 | 85.7 |

[1] Mixture of 80% 2,4,4 trimethyl pentene-1 and 20% of 2,4,4 trimethyl pentene-2.
[2] Vinyl cyclohexene.
[3] Acrylonitrile content calculated from nitrogen analysis.

Of the polymers listed in Table VII, the isobutylene copolymer was superior to all others in its ability to form fibers by the extrusion method. All of the polymers listed are worthy of note in showing that the newly invented method makes possible the preparation of acrylonitrile copolymers containing substantial amounts of combined olefin. Trimethylethylene and the isobutylene dimer are seen to be particularly adapted to copolymerize with acrylonitrile to form copolymers of 20% or more of combined olefin.

EXAMPLE VIII

Two sets of runs were made according to the present invention in order to illustrate the efficacy of various mercaptans as modifiers. The polymerizations were again carried out in the general manner previously described. The specific recipe in the set of runs numbered 1–12 was as follows:

Charge:                                           Grams
    Acrylonitrile _____ 70
    Isobutylene _____ 30
    Sodium lauryl sulfate _____ 0.3
    Sodium bicarbonate _____ 4.3
    Potassium persulfate _____ 0.75
    Water _____ 200
    Mercaptan: varied in type and amounts as indicated in Table VIII.
    Polymerization: 17.5 hours at 50° C.

The recipe used in the set of runs numbered 13–17 was as follows:

Charge:                                           Grams
    Acrylonitrile _____ 50
    Isobutylene _____ 50
    Sodium lauryl sulfate _____ 4.3
    Sodium bicarbonate _____ 0.6
    Water _____ 200
    Potassium persulfate _____ 0.75
    Mercaptan: As indicated in Table VIII.
    Polymerization: 17.5 hours at 50° C.

The data obtained from these runs are summarized in subjoined Table VIII.

*Table VIII*

| Run | Mercaptan added per 100 g. of monomers | | | | Conversion wt. percent | AN in [1] polymer wt. percent | Intrinsic Viscosity | Drawing and Extrusion Characteristics |
|---|---|---|---|---|---|---|---|---|
| | Type | Amount Added | | Total Added | | | | |
| | | g. | moles × 10³ | g. | moles × 10³ | | | | |
| 1 | $C_{12}$–$C_{14}$ [2] | 2 | 9.2 | 2 | 9.2 | 87 | 74.7 | 0.50 | Very good. |
| 2 | $C_{12}$–$C_{14}$ [2] | 1.27 | 5.83 | 1.27 | 5.83 | 80.5 | 72.3 | 0.61 | Good. |
| 3 | $C_{12}$–$C_{14}$ [2] | 0.84 | 3.87 | 0.84 | 3.87 | 86 | 73.3 | 0.76 | Poor. |
| 4 | $C_{12}$–$C_{14}$ [2] | 0.50 | 2.30 | 0.50 | 2.30 | 85 | 73.0 | 0.90 | Do. |
| 5 | { $C_{12}$–$C_{14}$ [2] / t-$C_8H_{17}SH$ } | 0.21 / 0.426 | 0.97 / 2.91 | 0.636 | 3.88 | 85 | 72.7 | 0.67 | Fair. |
| 6 | { $C_{12}$–$C_{14}$ [2] / t-$C_8H_{17}SH$ } | 0.21 / 0.852 | 0.97 / 5.82 | 1.06 | 6.79 | 81 | 72.6 | 0.48 | Very good. |
| 7 | t-$C_{12}H_{25}SH$ | 0.671 | 3.33 | 0.671 | 3.33 | 80 | 72.9 | 1.25 | Very poor. |
| 8 | t-$C_7H_{15}SH$ | 0.512 | 3.87 | 0.512 | 3.87 | 83 | 75.0 | 1.12 | Do. |
| 9 | { $C_{12}$–$C_{14}$ [2] / t-$C_{12}H_{25}SH$ } | 0.42 / 0.477 | 1.93 / 2.36 | 0.897 | 4.29 | 86 | 73.0 | 0.89 | Poor. |
| 10 | { $C_{12}$–$C_{14}$ [2] / t-$C_7H_{15}SH$ } | 0.42 / 0.342 | 1.93 / 2.58 | 0.762 | 4.51 | 83 | 74.3 | 0.90 | Do. |
| 11 | { $C_{12}$–$C_{14}$ [2] / t-$C_7H_{15}SH$ } | 0.21 / 0.423 | 0.97 / 3.20 | 0.633 | 4.17 | 84 | 74.0 | 0.88 | Do. |
| 12 | None | None | None | None | None | 80 | 73.3 | 1.60 | Very poor. |
| 13 | $C_{12}$–$C_{14}$ [2] | 0.76 | 3.50 | 0.76 | 3.50 | 62 | 70.5 | 0.76 | Good. |
| 14 | n-$C_4H_9SH$ | 1.254 | 13.9 | 1.254 | 13.9 | 52 | 71.4 | 0.82 | Do. |
| 15 | n-$C_4H_9SH$ | 0.63 | 6.95 | 0.63 | 6.95 | 53 | 70.0 | 1.20 | Poor. |
| 16 | n-$C_4H_9SH$ | 0.375 | 4.17 | 0.375 | 4.97 | 54 | 69.7 | 1.31 | Do. |
| 17 | None | None | None | None | None | 60 | 71.5 | 1.58 | Very poor. |

[1] Combined acrylonitrile content of polymer calculated from nitrogen analysis.
[2] Commercial mixture of primary $C_{12}$–$C_{14}$ mercaptans (average M. W. 217), prepared from corresponding mixture of alcohols (Lorol DDM).

Runs 1–4 show the beneficial effect of increasing mercaptan concentration on the extrusion characteristics of the resulting polymers and further substantiate the results shown in Table V as to the minimum amount of mercaptan for 70/30 feed mixtures of acrylonitrile with isobutylene. Runs 5 and 6 illustrate the results achieved by replacing a major portion of $C_{12}$–$C_{14}$ mercaptan with a tertiary $C_8$ mercaptan (diisobutylene mercaptan). The results indicate that this mercaptan is at least as effective as the $C_{12}$–$C_{14}$ mercaptan.

Runs 7–11 give the effect of tertiary dodecyl and tertiary heptyl mercaptans. A comparison of polymer viscosities obtained in these runs with the intrinsic viscosity of the mercaptan-free polymer of run 12 shows that either of these tertiary polymers exerts a pronounced modifying effect on the polymerization, though only about one half or one third as effective on a mole basis as the $C_{12}$–$C_{14}$ mercaptan used in runs 1–4. Hence, for aliphatic mercaptans of 4–16 carbon atoms generally the relation derived from Table V establishing minimum amount of mercaptan assuring the formation of extrudable polymers must be rewritten in the form of $$S' = \frac{3}{M.W.} \times 10^{\frac{C-60}{66.4}}$$

wherein S' is the minimum number of moles of mercaptan necessary per 100 grams of total monomers, M. W. is the molecular weight of the mercaptan and C is the weight in grams of acrylic nitrile per 100 grams of total monomers. It will be understood, of course, that this equation will give more than the necessary minimum in the case of especially effective mercaptans such as the $C_{12}$–$C_{14}$ mercaptan mixture or the tertiary $C_8$ mercaptan. However, the use of more than the bare minimum is not detrimental and actually still further improves the processability of the polymer as shown in runs 1–4.

The results of runs 13–17, wherein an acrylonitrile: isobutylene ratio of 50–50 was employed, as self-explanatory and show that the butyl mercaptan is also an effective modifier.

From all of these runs it is interesting to note that the maximum intrinsic viscosity allowable in extrudable polymers prepared according to the present invention is critical and substantially the same as shown in Table V, regardless of the species of mercaptan used.

All of the copolymers disclosed in this specification were evaluated as fiber-forming materials in a small, electrically heated extruder fitted with a 1/32" die. The powdered polymeric resin was fed into the extrusion barrel and the temperature adjusted to give a good extrusion rate where the material admitted of extrusion at all. All temperature measurements were made at the extruder head. The extruded rod was stretched by collecting on a motor driven spool which was rotated at a rate controlled to give a fiber of desired diameter. From 5 to 10 spools of fiber from each resin were collected at various extrusion temperatures, rates and draw ratios. It is obvious that considerable variation in factors is possible. Average values for extrusion temperature, tensile strength, shrinkage, etc. were determined.

The fibers were evaluated for tensile strength on a Scott microtester (model X–5) which is designed primarily for rubber samples, and hence the results may not be absolute. However, the data are entirely reproducible and are on a comparative basis. Shrinkage tests were run by immersing the fiber for 15 minutes in a bath of straight-run mineral spirits having a boiling range of 150 to 200° C., the bath being maintained at 75±0.2° C. and 90±0.3° C.

In many cases, particularly when the molecular weight of the polymer was too high, the polymer extruded as a rough, highly swollen rod. These products were very difficult to draw and were considered to be unsatisfactory for the preparation of fibers by extrusion. Several hundred spools of fiber were prepared and evaluated in this study and representative limiting data are shown in the following table:

The above results show that by proper selection of the ingredients of the polymerization charge it is possible to extrude copolymers containing 65 to 80 weight percent of bound acrylonitrile and to draw the extruded copolymers into resilient fibers of excellent tensile strength which may range from about 10,000 to 100,000 pounds per sq. inch. Furthermore, the above data indicate that by a proper variation of the ingredients in the charge within the above limits, it is possible to synthesize a fiber-forming polymer having the best suited properties for any particular purpose, a high-nitrile copolymer being preferred where fibers of unusually high solvent resistance are desired while, conversely, a low-nitrile copolymer is best where maximum tensile strength is the primary desideratum. The best all-purpose fiber has been found to be the one having a nitrile/isobutylene ratio in the feed of about 60/40 which fiber has both an excellent strength, good solvent resistance and good shrinkage characteristics or dimensional stability.

The drawing is best accomplished on a motor driven drum or spool. It may be accomplished in several stages at various temperatures in order to get the desired orientation. By operating at the correct temperature the extruded section can be drawn out to 50, 250 or even 750 times its length. The fibers may be subjected to an annealing treatment at elevated temperature after stretching in order to improve their dimensional stability. Dyes, pigments, delustering agents, resins, curing agents and the like may be incorporated into the polymer prior to fiber formation. Or, if desired, the copolymer may be partially hydrolyzed or chemically modified and crosslinking effected under tension. The following examples illustrate the extrusion and drawing characteristics of our novel polymers.

EXAMPLE IX

A mixture of 25 parts of acrylonitrile, 75 parts of isobutylene and 0.5 parts of commercial lauryl ($C_{12}$–$C_{14}$) mercaptan was emulsified with 200 parts of an aqueous solution containing 4.5 parts of sodium lauryl sulfate and 0.75 parts of potassium persulfate, the pH of the aqueous solution having been previously adjusted to a value of 7.8 by the addition of sodium bicarbonate, all parts being by weight. Upon heating this emulsion at 50° C. for 17.5 hours in a closed reactor, a copolymer was recovered therefrom containing 38% of bound isobutylene and 62% of bound acrylonitrile (as determined by nitrogen analysis). This copolymer was placed on a rubber mill at 310° F. and sheeted off after 5 minutes mastication as a clear, tough, flexible film. This material was fed in strips to an extruder equipped with a 1/32" die and extruded at a rate of about 6 inches per min. at different die plate temperatures and drawn on a spool revolving at about 1000 R. P. M. The best extrusion was obtained at about 320° F. at which temperature the diameter of the extruded rod was about 1 mm. and the diameter of the drawn fiber or monofil about 0.04 to 0.05 mm., indicating an extension ratio of about 400 to 600. The average Table IX

| Charge | | | Polymer | | | | |
|---|---|---|---|---|---|---|---|
| Acrylonitrile/ Isobutylene (wt. ratio) | $C_{12}$–$C_{14}$ mercaptan (wt. percent per monomers) | Int. Viscosity | Bound Acrylonitrile (wt. percent) | Extrusion Temperature (°F.) | Tensile Strength,[1] p. s. i. × $10^{-3}$ | Percent Linear Shrinkage in mineral spirits @— | |
| | | | | | | 75° C. | 90° C. |
| 40/60 | 0.5 | 0.9 | 65–68 | 336 | 65–80 | 40 | -------- |
| 50/50 | 0.7 | 0.8 | 68–70 | 340 | 45–44 | 33 | 83 |
| 60/40 | 0.9 | 0.7 | 71–73 | 347 | 38–45 | 20 | 79 |
| 70/30 | 1.25 | 0.6 | 73–76 | 358 | 28–38 | 5 | 20 |
| 80/20 | 2.0 | 0.5 | 76–80 | 384 | 20–28 | 2 | 8 |

[1] Determined on monofilaments 0.1 mm. in diameter.

tensile strength of the monofil was found to be 93,000 lbs. per square inch and its elongation about 60%.

When the same polymer was extruded at temperatures below about 310° F. it was not plastic enough to permit easy drawing, while at extrusion temperatures above about 330° F. the extruded rod was found to be noticeably more tender and weak which made its drawing to a fiber quite difficult. This indicates that the extrusion temperature passes through an easily determinable optimum which will yield the best possible fibers and which will permit the fiber-forming operation to proceed most satisfactorily.

EXAMPLE X

A copolymer was prepared as in Example IX except that the acrylonitrile-isobutylene feed ratio used was 80/20 and the amount of $C_{12}$–$C_{14}$ mercaptan added to the charge was 2.1 percent by weight of monomers. The resulting copolymer was found to have 75.3% of combined acrylonitrile and an intrinsic viscosity of 0.5. This material was milled at about 310° F., extruded at 380 to 410° F., and drawn as described in Example IX. The optimum extrusion was obtained at about 360° F., at which temperature the diameter of the extruded rod was about 1.5 mm. and the diameter of the drawn monofil was about 0.1, indicating an extension ratio of about 150. The formed monofil was observed to be slightly darker in color than the original resin, indicating that slight oxidation took place during the extension step. The tensile strength of the monofil was found to be about 32,000 lbs. per square inch and its elongation about 20 to 40%. A comparison of these results with those obtained in Example IX confirms that tensile strength and extrudability decrease and optimum extrusion temperature increases with increasing nitrile content. However, it is likely that these differences in physical properties would be smaller than indicated by the given absolute figures if in both cases the amount of drawing, that is, the degree of molecular orientation had been carried to the same extent.

Finally, when the copolymer of Example X was extruded in a nitrogen atmosphere at temperatures gradually increased to well over 400° F., no serious darkening or degradation occurred showing that the copolymer is inherently stable even at these high temperatures.

EXAMPLE XI

Fibers prepared from isobutylene-acrylonitrile copolymer of the present invention and containing 60% or more of combined acrylonitrile were immersed in several different solvents for three hours at room temperature. Those containing 60% of acrylonitrile became highly dispersed in benzene, methyl ethyl ketone and chloroform, while those containing 70% or more of acrylonitrile were unaffected by benzene or chloroform and only very slightly swollen in methyl ethyl ketone. All fibers tested were unaffected by carbon tetrachloride, but all those containing up to 85% of combined acrylonitrile were freely soluble in nitro-methane, nitroethane, nitropropane, nitrocyclohexane and their hydroxyl or halogen derivatives. This solubility in nitroparaffins of the copolymers of the instant invention can be made use of in the formulation of protective coatings. Indeed, for coating purposes or for spinning operations it was found that solutions of the instant copolymers in nitroparaffins such as nitromethane could be successfully diluted with varying amounts of thinners such as methylethyl ketone, carbon tetrachloride, benzene, ethyl acetate and the like, while isopropyl alcohol, methyl alcohol, diethyl ether and the like caused precipitation of the copolymer and/or were immiscible with the solution of copolymer in nitromethane.

Furthermore, we have found that synthetic fibers of the general type described hereinbefore can be subjected to controlled hydrolysis so as to render them exceptionally well suited for fabrics to be used in wearing apparel. It is well known that most commercial synthetic fibers have a cool and clammy feel due to poor moisture absorption and transfer properties. By hydrolyzing our isobutylene-acrylonitrile copolymers so that they contain 5, 20 or even 80% of the theoretical amount of carboxyl groups, the moisture absorption is increased and fabrics made from extruded fibers of hydrolyzed polymer are warm and soft to the touch, thereby overcoming one of the principal handicaps that are characteristic of synthetic fibers as compared with natural ones. Any fiber-forming copolymer containing 50% or more of bound nitrile may be hydrolyzed, thereby also markedly improving its dyeing characteristics with basic type dyes.

Hydrolysis of polymers of the above type may be carried out by a caustic treatment of the latex or coagulate or a solution of the polymer in inert solvent. The degree of hydrolysis is controlled by the concentration and amount of alkali solutions, by the reaction time and temperature. Hydrolysis to any desired ratio of —$CONH_2$ to —COOH may also be effected.

In addition to modifying the simple copolymers by the hydrolytic method described, it is also possible to obtain modified copolymers by adding a third or even a fourth copolymerizable substance to the principal monomeric mixture, thereby obtaining tripolymers or tetrapolymers of improved dimensional stability, softening point and other properties. Among such useful comonomers are: vinyl chloride, vinylidene chloride, methacrylonitrile, vinyl fluoride, dichlorostyrene, vinyl ketones, acrylamide, methacrylamide, chloroacrylonitrile, and the like. In order to obtain copolymers best suited for fiber formation, we have found it preferable to polymerize mixtures containing at least 25% but preferably 50 parts or more of acrylonitrile, at least 15 and up to 75 parts of isobutylene and a third comonomer of the class just described, the latter being present in a proportion not exceeding about 35 to 50 parts per 100 parts of the other two comonomers combined.

Chemical modifications by sulfuric acid, nitric acid, halogens, mercaptans, maleic anhydride, phenol and other reagents may be obtained. Use of the above described polymers and their chemical derivatives in fibers, films, surface coatings, molded objects, rubber and resin plasticizers is indicated. As an example, a tripolymer containing about 70% acrylonitrile, 5–10% acrylamide and 20–25% isobutylene may be compounded with formalin, trioxane, dimethylol urea or hexamethylene tetramine and then extruded and drawn to a fiber at a relatively low temperature. The fiber may then be subjected to heat, while under tension in either a static or continuous system, in order to effect cross-linking. Hydrogen chloride, sulfur dioxide, acetic acid or other acidic compounds may be present in the atmosphere to catalyze the condensation.

The present application is a continuation-in-part of the original application Serial No. 794,434, filed December 29, 1947, now Patent 2,621,170, and is directed primarily to the preparation of cationic derivatives of olefin-acrylonitrile copolymers, and uses thereof particularly as soil conditioners.

Acrylonitrile-alkene copolymers can be successfully hydrolyzed with sulfuric acid of about 50 to 80% concentration, at a temperature of about 100–150° C., and the resulting products can be converted into corresponding salts of inorganic bases.

However, to avoid possible chain-cleavage during such hydrolysis of the copolymer per se, it is preferable to dissolve the copolymer, in dilute concentration, in a suitable organic solvent, such as nitromethane and other solvents mentioned hereinbefore, and then hydrolyze the copolymer while in such solution.

It should be noted that for the purpose of making cationic derivatives, particularly such derivatives of polymers of high molecular weight for use as soil conditioners, it is not necessary to limit the molecular weight as required for making copolymers which extrude easily. In other words, instead of having an upper limit of intrinsic viscosity in the range of 1.0 or so, the intrinsic viscosity may be at least as high as 2.5. In fact, for use as soil conditioners, it is preferable to raise the lower limit of the intrinsic viscosity from the 0.1 referred to above for extrusion purposes, to a minimum of about 0.4, or preferably 0.5 or 0.6.

Although no exact correlation has yet been worked out to show the true relation of intrinsic viscosity and molecular weight, it is believed that the acrylonitrile-alkene copolymers having an intrinsic viscosity of 0.4 to 2.5, have a Stuadinger molecular weight in the range of about 5,000 to 20,000. Those in the higher molecular weight range appear to be most effective as soil conditioners.

It may also be noted that although copolymers having the highest nitrile content are capable of having the most hydrolyzed groups, on the other hand they are most difficultly soluble in organic solvents. Copolymers of about 60 to 90% of the nitrile and 40 to 10% of alkene may be used, but in general, copolymers such as acrylonitrile-isobutylene copolymers are most practical when they contain about 65 to 75% by weight of combined acrylonitrile and the balance i. e. about 35 to 25% by weight of combined isobutylene.

The additional data given herebelow illustrate the application of the invention to the field of soil conditioners.

Copolymers of acrylonitrile and isobutylene were prepared according to the general procedure given hereinabove. In each case the polymerization charge was:

| | Parts by weight |
|---|---|
| Monomers (ratios noted below) | 100 |
| Water | 200 |
| $K_2S_2O_8$ | 0.3 |
| Lorol mercaptan | Varied |
| Orvus paste (33% sodium lauryl sulfate) | 13.5 |
| Reaction, 18 hours at 50° C. | |

Products were recovered by coagulation with isopropyl alcohol. They were then water washed to remove any residual monomers, emulsifier, etc. The specific copolymers prepared were:

Table X

| | A | B | C | D |
|---|---|---|---|---|
| Acrylonitrile, pts | 25 | 80 | 50 | 50 |
| Isobutylene, pts | 75 | 20 | 50 | 50 |
| Product: | | | | |
| Percent Acrylonitrile [1] | 65 | 74 | 70 | 70 |
| Int. Visc [2] | 0.67 | 0.60 | 0.86 | 1.54 |

[1] Calculated from nitrogen content.
[2] Calc. from visc. measurements on solvent (nitromethane) and solutions of 0.2 g. polymer/100 ml. of nitromethane.

Samples of the dry polymers were dissolved in nitromethane to give solutions of about 5% polymer content, specifically 10 g. of polymer/200 ml. solvent. These solutions were diluted further with about ½ volume of methyl ethyl ketone per volume of solution. The final solution was heated to reflux with good agitation and 14–17 cc. of 70% $H_2SO_4$ was added slowly (during ½ to 1 hour) to the refluxing solution. The quantity of acid used was about 20% excess of the theoretical amount required for complete hydrolysis. After completion of the addition of acid, the mixture was agitated under reflux for at least one hour then, water (at least 1 mole/mole of $H_2SO_4$) was slowly added and the stirring continued for an additional half hour. By this time the product had separated as a fine slurry of polymer "crumbs." The mixture was then cooled and poured into a large volume of cold water. The product was filtered off, washed thoroughly and then dried or dissolved directly in a selected alkaline solution. Analysis of the final products for nitrogen indicated that 60 to 90% of the nitrile groups had been hydrolyzed.

A weighted sample of dry product was then either dissolved in an aqueous solution containing a known amount of NaOH, $NH_4OH$, KOH or $Ca(OH)_2$, or the wet polymer was dissolved directly in an aqueous solution of known caustic content. In either case the solids content of the final solution was determined by evaporating an aliquot to dryness and weighing the residue. In cases when an excess of caustic was present, the concentration of the salt solution was corrected accordingly.

Sufficient solution was taken to give 0.025, 0.05 or 0.10 gram of polymer acid salt (representing 0.05, 0.1 and 0.2% respectively on 50 g. of soil) and this volume was diluted to 50 ml. in a 100 ml. graduate. A 50 g. sample of 40 mesh and finer clay soil was then added to the graduate, the contents thoroughly mixed, the volume diluted to exactly 100 ml. and the contents of the flask agitated again until homogeneous. The graduate was then allowed to stand and the volume of soil sediment noted at intervals over an 18 hour period. In this test a larger final settled soil volume is taken as indicative of a greater degree of aggregation of the soil particles. The results are to be compared to untreated soil which gave a final sediment volume of 47 ml.

Various salt solutions prepared from Polymer B (see Table X) gave the following test data:

Table XI

| Type of Salt | None | Na+ | | K+ | | NH4+ | | Ca++ | |
|---|---|---|---|---|---|---|---|---|---|
| Conc., Wt. percent on soil | | 0.05 | 0.1 | 0.05 | 0.1 | 0.05 | 0.1 | 0.05 | 0.1 |
| Vol. of Soil Sediment in ml.: | | | | | | | | | |
| @ ½ hr | 86 | 66 | 65 | 67 | 65 | 72 | 62 | 64 | 65 |
| @ 4½ hrs | 50 | 54 | 52 | 54 | 53 | 53 | 52 | 53 | 53 |
| @ 20 hrs | 47 | 53 | 52 | 53 | 53 | 52 | 52 | 52 | 53 |

The NH4+ and Na+ salt at 0.2% on the soil gave soil sediment volumes of 52 ml. after 18 hours.

These data show that the salts have very nearly identical effects and in each case the "conditioned" soil has a greater final volume than the control, indicating an increase in soil aggregation.

Salts prepared from hydrolyzed Polymer A, gave test data as follows:

Table XII

| Type of Salt | Na+ | | K+ | NH4+ |
|---|---|---|---|---|
| Conc. Wt. Percent on Soil | 0.05 | 0.10 | 0.10 | 0.05 |
| Vol. of Soil Sediment in ml. @: | | | | |
| ½ hr | 66 | 60 | | 66 |
| 4 hrs | 53.5 | 54 | 54.5 | 57.5 |
| 18 hrs | 53 | 54 | 54 | 57 |

These data show that the salts of the polyacids are active and quite similar to those prepared from Polymer B with the exception of the ammonium salt which had unusually high activity.

Salts were prepared from hydrolyzed polymers C and D to determine the effect of molecular weight on "conditioner" activity. Here molecular weight is assumed to be proportioned to intrinsic viscosity, at least for a polymer of a given nitrile content. Test data relating to these products are summarized as follows:

Table XIII

| Polymer | C | | D | |
|---|---|---|---|---|
| Type of Salt | NH4+ | | NH4+ | Na+ |
| Conc. Wt. Percent on Soil | 0.05 | 0.10 | 0.05 | 0.10 |
| Vol. of Soil Sediment in ml. at: | | | | |
| ½ hr | 76 | 67 | 70 | 70 |
| 4 hrs | 54 | 55.5 | 59 | 58 |
| 18 hrs | 54 | 55 | 58.5 | 58 |

These data indicate that the higher molecular weight materials are somewhat more active.

For soil conditioner purposes, it is not necessary to limit the invention to the particular relation of acrylonitrile content to intrinsic viscosity hereinabove disclosed for extrudability purposes.

It is not intended that the invention be limited to the specific modifications which have been given merely for the sake of illustration, but only by the appended claims in which it is intended to claim all novelty inherent in the invention as well as all modifications coming within the scope and spirit of the invention.

What is claimed is:

1. A hydrolyzed copolymer of about 62 to 85% by weight of an acrylic-nitrile monomer having the formula $CH_2=CY-CN$ where Y is the member of the group consisting of hydrogen, methyl, ethyl, and chlorine, and correspondingly 38 to 15% by weight of a compound having 2 to 8 carbon atoms selected from the group consisting of aliphatic and cyclic olefins and chlor-substituted olefins, said copolymer having an intrinsic viscosity between 0.1 and 1, and wherein said copolymer contains between 5–80% of the theoretical amount of carboxyl groups.

2. A hydrolyzed copolymer of about 62 to 85% by weight of acrylonitrile and correspondingly 38 to 15% by weight of isobutylene, said copolymer having between 5–80% of the theoretical amount of carboxyl groups and having an intrinsic viscosity between 0.1 and 1.

References Cited in the file of this patent

UNITED STATES PATENTS

| 2,504,054 | Tawney | Apr. 11, 1950 |
| 2,606,176 | Dunn | Aug. 5, 1952 |
| 2,625,529 | Hedrick et al. | Jan. 13, 1953 |